(12) United States Patent
Jezernik et al.

(10) Patent No.: US 8,024,136 B2
(45) Date of Patent: Sep. 20, 2011

(54) METHOD FOR SIGNAL PROCESSING OF MEASUREMENT SIGNALS OF A VORTEX FLOW TRANSDUCER

(75) Inventors: Saso Jezernik, Zürich (CH); Ole Koudal, Baden (CH); Rainer Höcker, Waldshut (DE)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 11/785,941

(22) Filed: Apr. 23, 2007

(65) Prior Publication Data

US 2008/0011099 A1    Jan. 17, 2008

Related U.S. Application Data

(60) Provisional application No. 60/799,646, filed on May 12, 2006.

(30) Foreign Application Priority Data

May 12, 2006   (DE) .......................... 10 2006 022 635

(51) Int. Cl.
*G01F 1/00*   (2006.01)
(52) U.S. Cl. ....................................................... 702/45
(58) Field of Classification Search ...................... 702/45
See application file for complete search history.

(56) References Cited

U.S. PATENT DOCUMENTS

| | | | |
|---|---|---|---|
| 3,813,939 A | 6/1974 | Head | |
| 4,592,240 A | 6/1986 | McHale | |
| 6,276,218 B1 * | 8/2001 | Waers | ........................ 73/861.22 |

FOREIGN PATENT DOCUMENTS

| | | |
|---|---|---|
| DE | 32 20 539 A1 | 12/1983 |
| EP | 0 229 933 B1 | 7/1987 |
| WO | WO 90/04230 | 4/1990 |

OTHER PUBLICATIONS

Williem H. Press et al., "Numerical Recipes in C: the Art of Scientific Computing", 1988, Cambridge University Press, XP002441633.

* cited by examiner

*Primary Examiner* — Aditya Bhat
(74) *Attorney, Agent, or Firm* — Bacon & Thomas, PLLC

(57) ABSTRACT

A method for signal processing of measurement signals of a vortex flow transducer for measuring flow of a medium through a measuring tube. The method is characterized by low needs as regards computing power and memory space. The transducer includes a bluff body arranged in the measuring tube and a sensor for registering pressure fluctuations arising at the bluff body and for converting such pressure fluctuations into an electrical measurement signal. In the method, at least a portion of the measurement signal is sampled and digitized, an autocorrelation of the digitized measurement signal is calculated, and the flow is derived on the basis of at least one characteristic of the autocorrelation.

16 Claims, 4 Drawing Sheets

1

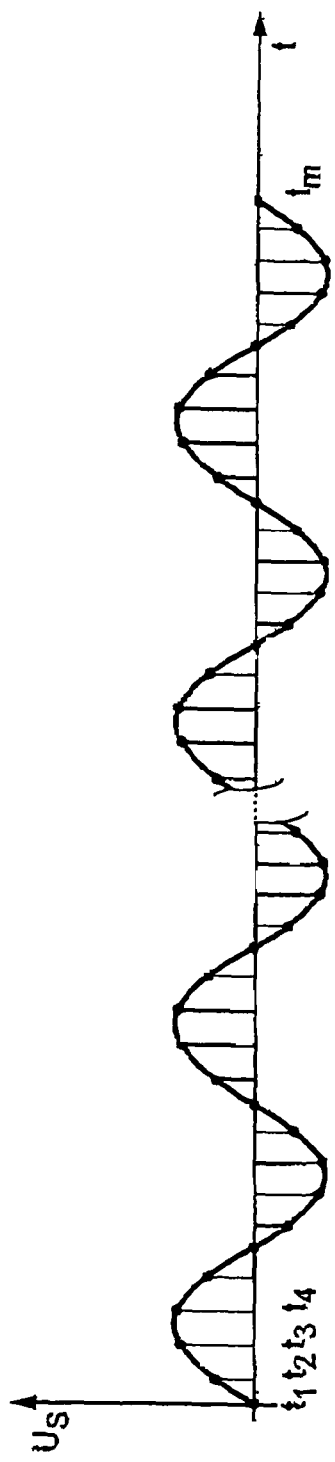
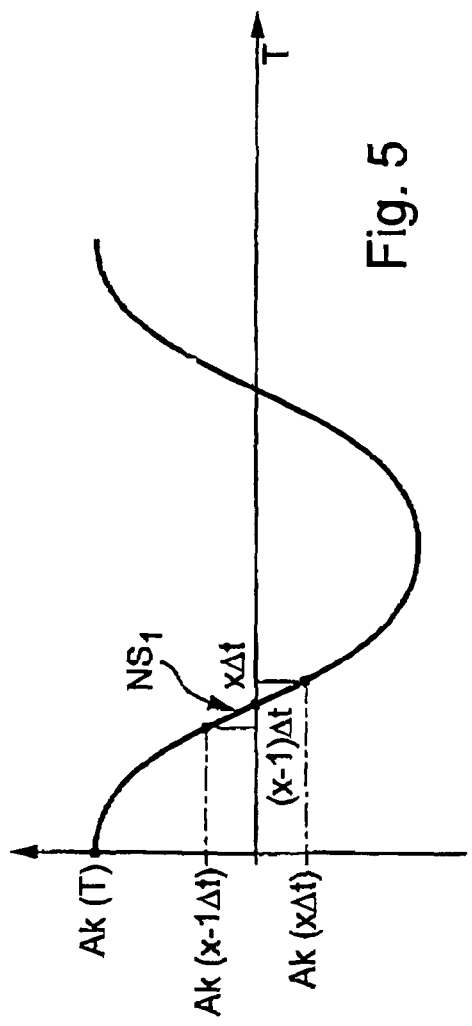

# METHOD FOR SIGNAL PROCESSING OF MEASUREMENT SIGNALS OF A VORTEX FLOW TRANSDUCER

CROSS-REFERENCE TO RELATED APPLICATION

This application is a Nonprovisional Application which claims the benefit of U.S. Application Ser. No. 60/799,646 filed on May 12, 2006.

TECHNICAL FIELD

The invention relates to a method for signal processing of measurement signals of a vortex flow transducer.

BACKGROUND DISCUSSION

Vortex flow transducers are used in industrial measurements technology for measuring volume flow. They work according to the principle of the Karman vortex street. In such case, a medium, whose volume flow, e.g. flow rate, is to be measured, is allowed to pass through a measuring tube containing a bluff body. Behind the bluff body, vortices of opposite rotational sense form alternately from both sides of the bluff body. Associated with these vortices are areas of reduced pressure. The pressure fluctuations are registered by the transducer and converted into electrical measurement signals. The vortices form, within the design limits of the transducer, very regularly. The number of vortices produced per unit time is proportional to the volume flow rate.

Suitable for registering the pressure fluctuations are e.g. capacitive sensors, such as are described in European Patent EP-B1 0 229 933.

The electrical measurement signals derived from the transducer exhibit, in the ideal case, a sinusoidal behavior. Current practice is to ascertain the number of vortices per unit time therefrom on the basis of the zero-crossings of the electrical signal. In such case e.g. the time from one zero-crossing to the next is measured, or e.g. in a time interval, the time from the first to the last zero-crossing and the number of zero-crossings occurring in the time interval are ascertained.

Under real measurement conditions, the case can arise in which disturbances are superimposed on the ideal, sinusoidal signal, such that an additional zero-crossing occurs, or a zero-crossing disappears. Such measurement errors are detected only with great difficulty.

A further disadvantage of such methods is that, additionally, there is information present in the signal, such as its amplitude or its harmonics, which goes unused.

This information can be captured for use, by performing a frequency determination, for example by means of a fast Fourier transform (FFT). Such methods require, however, that the measurement signal be digitized using a high sampling rate and that, at least temporarily, a large number of sampled values be stored. Moreover, this form of frequency determination requires a large number of mathematical operations.

Vortex flow meters are already currently available in the form of so-called two-wire devices. Such two-wire devices have two connecting lines, via which both the energy, or power, supply of the device and also the transmission of the measurement results are accomplished. In industrial applications, a standard has arisen for these two-wire devices, according to which the energy supply uses a 24-volt voltage source and the current flowing through the connecting lines is controlled to values between 4 mA and 20 mA, depending on the measurement results to be transmitted. As a result, only a small electrical power is available to these transducers, and, correspondingly, the achievable computing power is narrowly limited.

SUMMARY OF THE INVENTION

It is an object of the invention to provide a method for signal processing of measurement signals of a vortex flow transducer, which method has low requirements for computing power and memory space.

To this end, the invention resides in a method for signal processing of measurement signals of a vortex flow transducer for measuring flow of a medium through a measuring tube. The transducer includes a bluff body arranged in the measuring tube, and a sensor for registering pressure fluctuations arising at the bluff body and for converting such pressure fluctuations into an electrical measurement signal. In the method, at least a portion of the measurement signal is sampled and digitized, an autocorrelation of the digitized measurement signal is calculated, and flow is derived on the basis of at least one characteristic of the autocorrelation.

In an embodiment of the method, the characteristic is a frequency or a period of the autocorrelation, and the frequency or the period of the autocorrelation is set equal to a frequency or a period of the measurement signal.

In a first further development, a zero or a minimum of the autocorrelation is ascertained, and the characteristic of the autocorrelation is determined on the basis of the location of the zero or the minimum.

In a further development, the location of the minimum is determined by fitting a parabola to points of the autocorrelation.

In another further development, the characteristic of the autocorrelation is the frequency or period of the same and such is ascertained by fitting a cosine function to the autocorrelation.

In an embodiment, the measuring signal is passed through an adaptive filter before the forming of the autocorrelation.

In a further development of the last-mentioned embodiment, the adaptive filter is an adaptive bandpass filter.

In a further development of the last-mentioned embodiment, a frequency of the autocorrelation is ascertained, and a passband of the bandpass filter is set on the basis of the frequency of the autocorrelation.

In another further development of the last-mentioned embodiment, an adaptive line enhancer is applied as the adaptive bandpass filter.

In another further development of the last-mentioned embodiment, the adaptive filter is a notch filter.

In a further development of the last-mentioned further development, the adaptive notch filter executes a filter function, which delivers a remainder signal, which serves for optimizing the filter, and a filter function complementary thereto, which delivers the measurement signal, on the basis of which the autocorrelation is determined.

Additionally, the invention resides in a vortex flow transducer for measuring flow of a medium through a measuring tube. The transducer includes a bluff body arranged in the measuring tube,
 a sensor for registering pressure fluctuations occurring at the bluff body and for converting such pressure fluctuations into an electrical measurement signal,
 an analog-digital converter, which serves for sampling and digitizing at least a portion of the measurement signal, and a signal processing unit, which serves for calculating an autocorrelation of the digitized measurement signal and for deriving the flow on the basis of at least one characteristic of the autocorrelation.

An advantage of the invention is that, by the autocorrelation, not only individual measured points of the measurement signal enter, but also the course and amplitudes of the measurement signal are taken into consideration. In this way, a higher accuracy of measurement is achieved.

A further advantage is that white noise superimposed on the measurement signal affects the autocorrelation only at the correlation time zero and, consequently, can be very easily eliminated.

BRIEF DESCRIPTION OF THE DRAWINGS

The invention and additional advantages will now be explained in greater detail on the basis of the figures of the drawing, in which five examples of embodiments are presented; equal parts are supplied in the figures with equal reference characters. The figures show as follows:

FIG. 4 a measurement signal as a function of time;
FIG. 5 an autocorrelation of the measurement signal of FIG. 4 as a function of correlation time.

DETAILED DESCRIPTION

Figure 1:
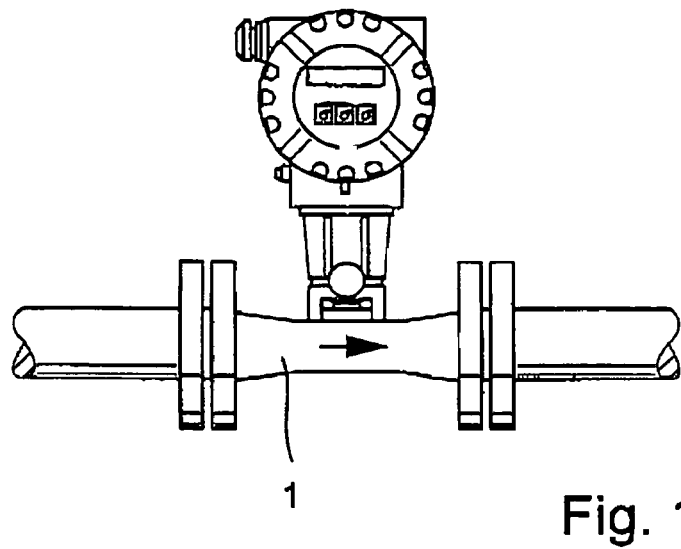
FIG. 1 a vortex flow measuring device.
Figure 2:
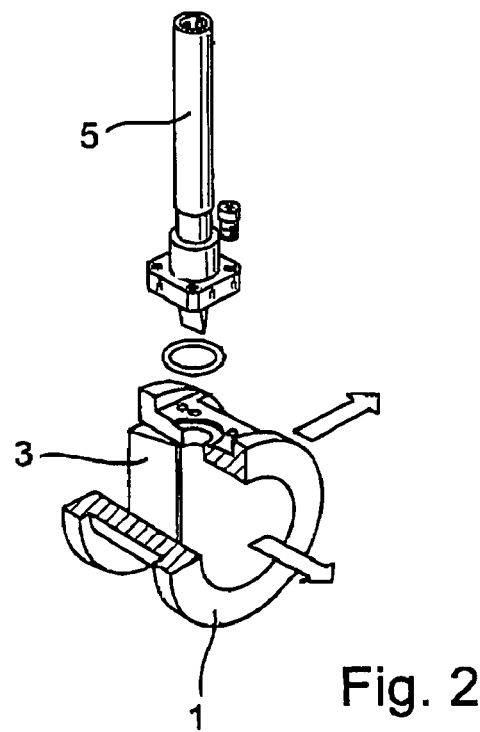
FIG. 2 a transducer for a vortex flow measuring device.
Figure 3:
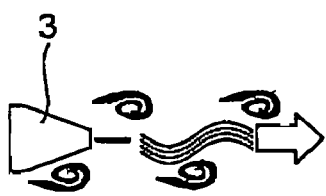
FIG. 3 schematically, the development of vortices behind a bluff body.

FIG. 1 shows an example of a vortex flow measuring device, and FIG. 2 an example of its transducer. The transducer works according to the principle of the Karman vortex street. A medium, whose volume flow is to be measured, is directed through a measuring tube 1. Inserted into the flow path of the medium (the flow path is indicated by an arrow) is a bluff body 3. Vortices of opposite sense form in alternation on the two sides of the bluff body. This is shown schematically in FIG. 3. Each vortex causes a localized, reduced pressure. The resulting pressure fluctuations are registered by the transducer and converted into electrical measurement signals. The vortices form, within the design limits of the transducer, very regularly. The number of vortices produced per unit time is proportional to the volume flow rate. The frequency f of the measurement signals is proportional to the flow velocity of the medium in the measuring tube 1, which is, in turn, proportional to the volume flow rate.

A sensor 5 is provided for registering pressure fluctuations arising at, e.g. on, or behind, i.e. in the region of, the bluff body 3 and for converting such pressure fluctuations into an electrical measurement signal $U_s$. Suitable for this purpose are pressure sensors, such as e.g. the initially mentioned, capacitive sensors. Sensor 5 is arranged in the measuring tube 1 in the flow direction behind the bluff body 3. The electrical measurement signals $U_s$ derived by the sensor 5 exhibit, in the ideal case, a sinusoidal behavior. FIG. 4 shows such a measurement signal $U_s$ as a function of time t. The frequency f of the measurement signal $U_s$ is proportional to the flow velocity of the medium in the measuring tube 1 and thus also to the volume flow rate.

According to the invention, at least a portion of the measurement signal $U_s$ is sampled and digitized. In such case, it is sufficient to sample and digitize a signal train, which contains only a small number of oscillations, e.g. 10 oscillations, with an adequate sampling rate, e.g. 10 points per oscillation. The individual sample points are indicated in FIG. 4 and are available, after the digitizing, as measured points $[U_s(t_i); t_i]$, wherein $U_s(t_i)$ is the value of the measurement signal $U_s$ registered at the sampling point in time $t_i$ and i is a whole-numbered, running index i=1 ... M. Between two sampling points in time $t_i$ and $t_{i+1}$ following one after the other lies an identical time interval $\Delta t$ predetermined by the sampling rate.

According to the invention, an autocorrelation AK(T) is calculated as a function of the correlation time T of the digitized measurement signal $U_s(t)$, and flow is derived on the basis of a characteristic of the autocorrelation AK(T).

The autocorrelation AK(T) can be determined, for example, from the following formula:

$$AK(T) = \sum_{i=1}^{N} U_s(t_i) U_s(t_i + T).$$

The measurement points $U_s(t_i)$ are sampled at discrete points in time $t_i$. Correspondingly, the autocorrelation AK(T) can be calculated for discrete correlation times $T_k$, where $T_k = k\,\Delta t$, with k=0, 1, 2 ... K and the condition N+K≦M is fulfilled.

The autocorrelation function of a periodic signal is likewise periodic and has the same frequency f and the same period P as the starting signal. If the starting signal is sinusoidal, e.g. in the form $U(t) = U_0 \sin(2\pi f t)$, then the associated autocorrelation function is a cosine function $AK_U(T) = A_0 \cos(2\pi f T)$ with the same frequency f.

The autocorrelation function of an uncorrelated signal S, e.g. of white noise, only has a value different from zero at the correlation time T=0. For all other correlation times T≠0, the associated autocorrelation $AK_s(T)=0$.

In the ideal case of the sinusoidal measurement signal $U_s(t)$ shown in FIG. 4, the following relationships then hold:

$$AK(T) = \sum_{i=1}^{N} U_s(t_i) U_s(t_i + T) = C \cos(2\pi f T)$$

where C is a constant and
f is the frequency of the measurement signal $U_s(t)$.

The associated autocorrelation function AK(T) is shown in FIG. 5.

Figure 6:
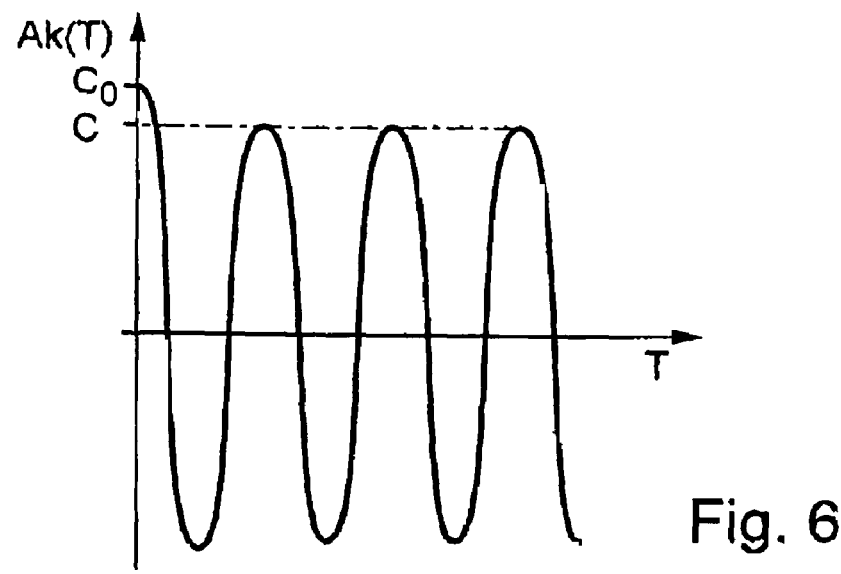
FIG. 6 an autocorrelation of a sinusoidal measurement signal superimposed exclusively with white noise.

If the measurement signal is composed of a sinusoidal signal superimposed solely with white noise, then the last mentioned relationship holds only for correlation times T≠0. At T=0, the autocorrelation AK(T) has a value C0 greater than C. A corresponding autocorrelation function is shown in FIG. 6. White noise affects the autocorrelation only at the value T=0. All other regions of the autocorrelation are noise-free.

A characteristic of the autocorrelation AK(T) is ascertained and the flow derived on the basis of this characteristic. Preferably, the characteristic of the autocorrelation AK(T) is a frequency f or a period P of the autocorrelation AK(T). As explained above, the frequency f of the autocorrelation, respectively its period P, is essentially equal to the frequency f, respectively period P, of the measurement signal $U_s$. The latter is a measure for the flow and can, as described above, be utilized for ascertaining the flow. Preferably, in such case, the frequency f or the period P of the autocorrelation AK(T) is set equal to the frequency f or the period P of the measurement signal. This offers the advantage that the frequency f or period P of the measurement signal $U_s$ can be ascertained much more exactly on the basis of the autocorrelation AK(T) than possible by an evaluation of the original measurement signal $U_s$, e.g. by a registering of the zero-crossings of the measurement signal $U_s$. In the case of a registering of the zero-crossings of the measurement signal $U_s$, any disturbance can affect the number of the zero-crossings. In contrast, in the case of the autocorrelation, white noise acts only locally at the correlation time T=0. An additional advantage of the autocorrelation AK(T) is that its accuracy does not depend on the accuracy of the individual measurement points, but, instead, measurement points of a signal train are entered, and, therewith, information concerning amplitude and course of the utilized signal train are made use of. In line with this, the autocorrelation AK(T) is much better suited for ascertainment of the frequency f, respectively the period P, of the measurement signal $U_s$ than is the measurement signal $U_s$ itself.

Assuming that the measurement signal $U_s(t)$ is a sinusoidal signal, on which no, or only white, noise is superimposed, the frequency f of the autocorrelation function AK(T), and thus the frequency of the sensor signal, could already be calculated on the basis of a single value of the autocorrelation for T≠0. This manner of proceeding has, however, for real measurement signals, not delivered highly accurate, reproducible results. A reason for this lies in the fact that real measurement signals, besides containing a sinusoidal signal and white noise, also contain additional disturbance signals. According to the invention, therefore, a characteristic of the autocorrelation AK(T) is drawn upon for ascertaining flow. In such case, it is sufficient to limit the calculation of the essentially cosinusoidal autocorrelation to distinctive sections of the same. Distinctive sections lie, for example, in the regions of the zero-crossings, as well as the minima and maxima, of the autocorrelation.

In a first variant of the invention, the course, or curve, of the autocorrelation AK(T) in the region of the first zero-crossing is utilized. For this, the autocorrelation AK(T) is calculated, for example, for increasing correlation times T, with T=kΔt, with k=0, 1, 2 . . . , until at least a first negative value occurs, i.e. AK(xΔt)<zero, where x is a natural number between 1 and K. On the basis of these values, a first null- or zero-site (hereinafter just "zero" for sake of simplicity) NS1 of the autocorrelation AK(T) is ascertained. The location of the first zero NS1 can be determined, for example, by a simple interpolation, in which a straight line is extended between the point (AK(xΔt)<0; xΔt) and the preceding point (AK((x−1)Δt)>0; (x−1)Δt), where the autocorrelation has a positive value. The zero-crossing of the straight line is then set equal to the first zero NS1. The first zero NS1 is given, according to this, by the following formula:

$$NS1=(x-AK(x\Delta t)/[AK(x\Delta t)-AK((x-1)\Delta t)])\Delta t$$

The first zero NS1 corresponds to a quarter-period of the essentially cosinusoidal autocorrelation AK(T). A full period P of the autocorrelation AK(T) has, accordingly, a duration equal to four times the first zero NS1, i.e. the following relationship holds: P=4 NS1. Accordingly, a frequency f for the autocorrelation AK(T) is f=1/(4 NS1). This frequency f is very accurately the same as the frequency f of the measurement signal $U_s(t)$. The frequency f of the measurement signal $U_s(t)$ is, as a result, set equal to the frequency f of the autocorrelation AK(T) determined on the basis of the location of the first zero NS1. The same is true, correspondingly, for the period P.

The sought flow is proportional to the frequency f of the measurement signal $U_s$ and thus can be ascertained already on the basis of the first zero NS1 of the autocorrelation AK(T). Analogously, the flow can be ascertained, naturally, also on the basis of the associated period P.

An advantage of this method is that only a very small number of values of the autocorrelation is required, and the associated calculations are very simple operations, which involve only few steps. Accordingly, only very small amounts of memory space and a small computing power are needed for this method.

In a second variant of the invention, the course, or curve, of the autocorrelation AK(T) in the region of a minimum, preferably the first minimum M1, is used. The first minimum M1 can be ascertained in various ways. For example, the autocorrelation AK(T) is calculated for increasing values of T, with T=kΔt, with k=0, 1, 2 . . . , until at least one value AK(yΔt) of the autocorrelation AK(T) is found, which is greater than an immediately preceding value AK((y−1)Δt). This gives the approximate location of the minimum M1. The exact location of the minimum M1, i.e. the correlation time $T_{Min}$, at which the minimum M1 occurs, can then be ascertained on the basis of a derivative of the autocorrelation AK(T) in this region. In this case, made use of is the fact that a derivative of a function is equal to zero where the function has a minimum. It is thus possible to ascertain a zero of the derivative and to set such equal to the sought, first minimum M1.

Alternatively, it is possible to determine the first zero NS1, e.g. in the above-described way, and to estimate the location of the minimum M1 on the basis of the location of the first zero NS1. In such case, use is made of the fact that the minimum M1 is to be expected at a correlation time $T_{Min}$ equal to twice the correlation time of the first zero NS1. Additionally, preferably, a derivative of the autocorrelation is calculated in the region in which the minimum M1 is to be expected and a zero-crossing of the derivative is ascertained. The zero of the derivative corresponds to the location of the first minimum M1.

Figure 7:
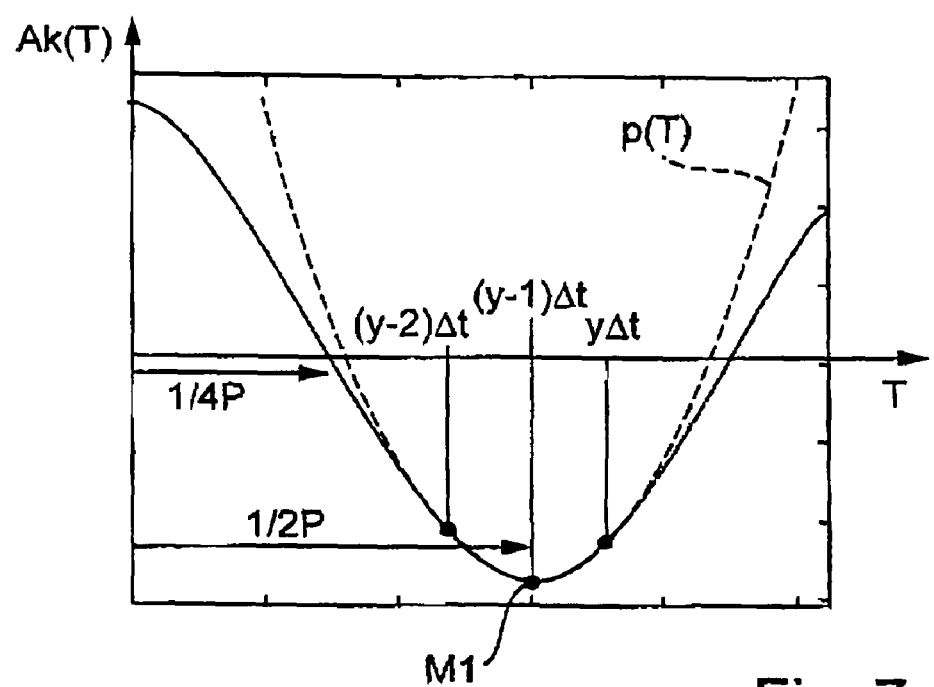
FIG. 7 a section of the autocorrelation containing a minimum and a parabola fitted to points in the vicinity of the minimum.

Preferably, the exact location of the minimum M1 is ascertained by a fitting of a parabola p(T) to points of the autocorrelation in the region of the minimum. This can, as shown in FIG. 7, be done on the basis of at least three points of the autocorrelation AK(T). Suitable as points are e.g. the above-cited ones, [AK(yΔt); yΔt], [AK((y−1)Δt); (y−1)Δt] and the point [AK((y−2)Δt); (y−2)Δt] preceding them. The parabola p(T) is shown as a dashed line in FIG. 7.

Likewise the zero-crossing of the derivative of the autocorrelation AK(T) can be used in the choice of the points. In such case, for example, that point of the autocorrelation having the smallest distance from the zero of the derivative, as well as the two points, neighbors thereof, lying immediately right and left thereof, can be used.

To these three points, a parabola is fitted, as shown in FIG. 7. For this, the following ansatz can be used:

$$p(T)=p_0(T-T_{Min})^2+p_1$$

where $p_0$, $p_1$ and $T_{Min}$ are coefficients determined on the basis of the three points of the autocorrelation AK(T). The correlation time $T_{Min}$ corresponds to the location of the minimum of the parabola p(T) and reflects the correlation time of the minimum of the autocorrelation AK(T) very accurately. Correspondingly, it is equal to the correlation time $T_{Min}$ of the minimum M1 of the autocorrelation AK(T). In this way, the minimum is then also very accurately determinable, when only a few points of the autocorrelation are available.

The parabola can, naturally, also be fitted to more than three points of the autocorrelation, e.g. on the basis of the method of least squares. This can especially bring about an improved accuracy, when the measurement signal is digitized with a high sampling rate and, consequently, more than the above-mentioned 10 points per oscillation are present.

The correlation time $T_{Min}$ of the first minimum M1 corresponds to a half-period ½ P. The frequency f of the autocorrelation AK(T) and thus of the measurement signal $U_s$ is, therefore, $f=1/(2 T_{Min})$.

Both above-described methods are successful on the basis of a very small number of points of the autocorrelation. The number can even be further lessened, when, initially, an estimated value for the frequency f, respectively for the period P, is determined. Such an estimated value can be e.g. a measuring-device-specific value, or even a value for one of these variables determined in a preceding measurement. If such an estimated value is available, then the region in which the first zero NS1, respectively the first minimum M1, is to be expected can be bounded and the calculation of the autocorrelation can be limited to this region.

The accuracy, with which the flow is ascertainable, can be further increased by fitting a cosine function $K(T)=\cos(2\pi f_c T)$ to the autocorrelation AK(T). For this, preferably at least one full period of the autocorrelation AK(T) is calculated and the obtained autocorrelation is normalized. Preferably, in this case, the value of the autocorrelation at the autocorrelation time T=0 is omitted, since it is in this value that the white noise appears. The fitting can be done e.g. by minimizing a sum of the least squares J between the values of the cosine function and the associated, normalized values $ak(T_i)$ of the autocorrelation, with the frequency $f_c$ of the cosine function serving as fitting parameter.

The sum of the least squares can be determined, for example, according to the following formula:

$$J(f_c) = \sum_{l=1}^{L} (ak(l\Delta t) - \cos(2\pi f_c l \Delta t))^2$$

wherein l is a whole-numbered index running from 1 to L,
ak(lΔt) are the normalized values of the autocorrelation, and
$f_c$ is the fitting parameter.

Finally, that frequency $f_c$, at which an optimal fitting is obtained, is set equal to the frequency f of the autocorrelation AK(T) and equal to the frequency f of the measurement signal $U_s$, on the basis of which, then, using the relevant proportionalities, the flow is ascertained. The optimum fitting corresponds in the given example to the minimum of the sum of the least squares $J(f_c)$.

In real measuring situations, the measurement signal can contain, besides the essentially sinusoidal, sought signal and possibly present, white noise, additional, superimposed, disturbing signals, e.g. non-stationary noise, and it can exhibit amplitude fluctuations. Also in these situations, the described methods provide very accurate measurement results.

The accuracy of measurement can be still further improved by passing the measurement signal, before forming the autocorrelation, through a filter, and the autocorrelation AK(T) is then determined on the basis of the filtered measurement signal.

Figure 8:
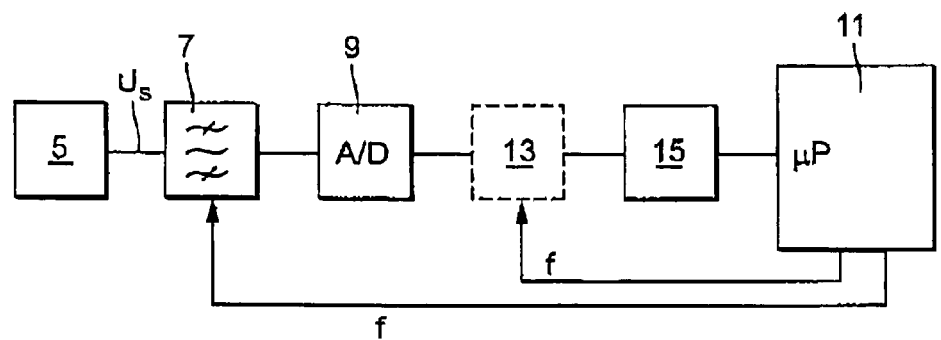
FIG. 8 a circuit containing an adaptive filter and connected to a sensor of the transducer.

FIG. 8 shows a corresponding circuit containing the sensor 5 and a filter 7 connected thereto. The filtered measurement signals are fed to an analog-digital converter 9, which then feeds the digital, filtered measurement signals to a signal processing unit 11, e.g. a microprocessor. The signal processing unit 11 determines, in the above-described manner, the autocorrelation and its characteristic, on the basis of which, subsequently, the flow is derived. This can be done also by means of the signal processing unit 11.

Filter 7, through which the measurement signal $U_s$ passes before the forming of the autocorrelation AK(T), is e.g. an adaptive, bandpass filter. Preferably, the frequency f of the autocorrelation AK(T) is determined and a frequency range, or passband, in which the bandpass filter is transmissive, is set on the basis of the frequency f of the autocorrelation. In such case, the fact is made use of, that the frequency f of the autocorrelation AK(T) is essentially equal to the frequency f of the measurement signal $U_s$. Filter 7 is, in such case, continuously matched to the frequency f of the measurement signal $U_s$ by being set to be transmissive only for a frequency range in the immediate vicinity of the frequency f of the measurement signal $U_s$. Thus, disturbance signals of other frequencies contained in the measurement signal are filtered out.

Alternatively, the passband of the bandpass filter can be set directly on the basis of the frequency of the measurement signal derived from the measurement signal. For this, for example, conventional counting of the zero-crossings of the measurement signal can be used and the frequency ascertained on the basis of the number of crossings per unit time.

Instead of, or in addition to, the illustrated, analog filter 7, also a digital filter 13 can be used. This is placed behind the analog-digital converter 9, as shown in dashed representation in FIG. 7. Suited for this are e.g. digital, adaptive, bandpass filters, which are applied analogously to the manner explained above in connection with the analog, adaptive, bandpass filter.

Another preferred example of a suitable digital filter 13 is a so-called adaptive line enhancer (ALE). This type of filter automatically sets itself to the frequency of the measurement signal and effects a damping of background noise.

Alternatively or additionally, especially at high sampling rates, an average-value filter 15 can be inserted. This is also shown in FIG. 8. Average value filters effect a smoothing of the measurement signal, by averaging over a plurality of sequentially following, measured values.

Figure 9:
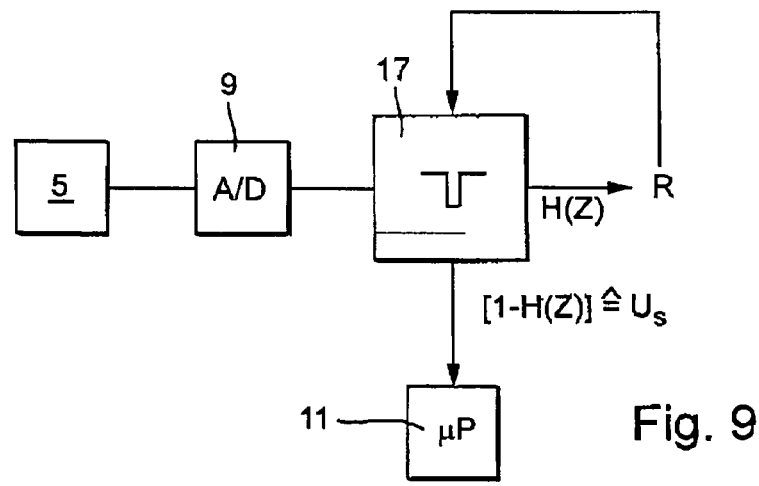
FIG. 9 a circuit containing a notch filter and connected to a sensor of the transducer.

FIG. 9 shows another circuit, by means of which the measurement signal is subjected to a filtering before the forming of the autocorrelation. The filter here is an adaptive, notch filter 17. Notch filters are highly selective filters characterized by a narrow stopband. A notch filter 17 described by a filter function H(z) delivers at its output a remainder signal R containing all parts of the input signal lying outside of the stopband. Usually, this remainder signal R is used for optimizing the notch filter 17. The optimizing of the notch filter can be effected, e.g. as schematically shown in FIG. 9, by an adapting of the filter such that the remainder signal R is minimized.

According to the invention, notch filter 17 executes, complementary to the filter function H(z), additionally the filter function 1-H(z), which filters from the incoming sensor signal the actual measurement signal $U_s$. The filtered-out measurement signal $U_s$ is then processed further, as above described, in that it is fed to the signal processing unit 11, its autocorrelation AK(T) is determined, and, on the basis of at least one characteristic of the autocorrelation AK(T), the flow is ascertained.

The invention claimed is:

1. A method for signal processing of measurement signals of a vortex flow transducer for measuring flow of a medium through a measuring tube, the transducer including: a bluff body arranged in the measuring tube; and a sensor which registers pressure fluctuations arising at the bluff body and converts such into an electrical measurement signal, said method comprising the steps of:

sampling and digitizing at least a portion of the measurement signal as a function of time;

calculating an autocorrelation of the digitized time dependent measurement signal; and deriving flow based on at least one characteristic of the autocorrelation, wherein:

the autocorrelation is calculated as a function of the correlation time of the digitized time dependent measurement signal.

2. The method as claimed in claim 1, wherein:

said characteristic is a frequency or a period of said autocorrelation; and said frequency or said period of said autocorrelation is set equal to a frequency or a period of the measurement signal.

3. The method as claimed in claim 1, wherein:

a zero or a minimum of said autocorrelation is ascertained; and said characteristic of said autocorrelation is determined based on said zero or said minimum ascertained.

4. The method as claimed in claim 3, wherein:

said minimum ascertained is located by a fitting of a parabola to points of said autocorrelation.

5. The method as claimed in claim 1, wherein:

said characteristic of said autocorrelation is the frequency or period of the same; and said characteristic is ascertained by a fitting of a cosine function to said autocorrelation.

6. The method as claimed in claim 1, wherein:

said measurement signal passes through an adaptive filter before said autocorrelation is formed.

7. The method as claimed in claim 6, wherein:

the adaptive filter is a notch filter.

8. The method as claimed in claim 7, wherein:

the adaptive notch filter executes a filter function, which delivers a remainder signal, which serves for optimizing the filter, and executes a filter function complementary thereto, which delivers the measurement signal, based on which said autocorrelation is determined.

9. The method as claimed in claim 1, wherein:

the adaptive filter is an adaptive bandpass filter.

10. The method as claimed in claim 9, wherein:

said frequency of said autocorrelation is ascertained; and a passband of the bandpass filter is set based on the frequency of said autocorrelation.

11. The method as claimed in claim 9, wherein:

an adaptive line enhancer is applied as the adaptive bandpass filter.

12. The vortex flow transducer as claimed in claim 1, wherein:

measurement points for the measurement signal are sampled at discrete sampling points in time, and the autocorrelation determined for discrete correlation times.

13. The vortex flow transducer as claimed in claim 12, wherein:

the discrete correlation times, for which the autocorrelation being determined, corresponds to $k\Delta t$, with $k=0, 1, 2, \ldots K$, where $\Delta t$ is time interval lying between two sampling points in time following one after and being predetermined by the sampling rate.

14. A vortex flow transducer for measuring the flow of a medium through a measuring tube, comprising:

a bluff body arranged in the measuring tube;

a sensor for registering pressure fluctuations arising at said bluff body and for converting such into an electrical measurement signal;

an analog-digital converter, which serves for sampling and digitizing at least a portion of said measurement signal as a function of time; and a signal processing unit, which serves for calculating an autocorrelation of said digitized time dependent measurement signal and for deriving flow based on at least one characteristic of said autocorrelation, wherein:

the autocorrelation is calculated as a function of the correlation time of the digitized time dependent measurement signal.

15. The vortex flow transducer as claimed in claim 14, wherein:

measurement points for the measurement signal are sampled at discrete sampling points in time, and the autocorrelation determined for discrete correlation times.

16. The vortex flow transducer as claimed in claim 15, wherein:

the discrete correlation times, for which the autocorrelation being determined, corresponds to $k\Delta t$, with $k=0, 1, 2, \ldots K$, where $\Delta t$ is time interval lying between two sampling points in time following one after and being predetermined by the sampling rate.

* * * * *